United States Patent [19]

Greenspun et al.

[11] Patent Number: 5,150,310
[45] Date of Patent: Sep. 22, 1992

[54] METHOD AND APPARATUS FOR POSITION DETECTION

[75] Inventors: Philip G. Greenspun, Melrose; Gregory B. Baecher, Wayland, both of Mass.

[73] Assignee: Consolve, Inc., Lexington, Mass.

[21] Appl. No.: 400,354

[22] Filed: Aug. 30, 1989

[51] Int. Cl.⁵ .............................................. G01S 3/02
[52] U.S. Cl. .................................... 364/516; 364/460; 364/452; 342/451
[58] Field of Search ............... 364/516, 559, 569, 451, 364/443, 460, 461, 450; 342/47, 147, 118, 451; 340/977, 979

[56] References Cited

U.S. PATENT DOCUMENTS

| | | | |
|---|---|---|---|
| 1,750,668 | 12/1927 | Green | 356/4 |
| 3,531,801 | 9/1970 | Huebscher | 342/451 |
| 3,568,161 | 3/1971 | Knickel | 364/516 |
| 3,588,249 | 6/1971 | Studebaker | 356/4 |
| 3,652,161 | 3/1972 | Ross | 356/3 |
| 3,659,085 | 4/1972 | Potter et al. | 364/460 |
| 3,775,735 | 11/1973 | Funk et al. | 340/4 R |
| 3,864,030 | 2/1975 | Cornsweet | 351/7 |
| 4,021,116 | 5/1977 | Martens | 356/4 |
| 4,103,302 | 7/1978 | Roeder et al. | 343/9 |
| 4,106,017 | 8/1978 | Roeder et al. | 343/8 |
| 4,110,754 | 8/1978 | Endo | 343/16 R |
| 4,119,379 | 10/1978 | Zindler | 356/4 |
| 4,140,060 | 2/1979 | Brenner | 102/214 |
| 4,171,907 | 10/1979 | Hill et al. | 356/5 |
| 4,273,196 | 6/1981 | Etsusaki et al. | 172/4.5 |
| 4,319,243 | 3/1982 | Vachenaeur et al. | 343/6.5 R |
| 4,413,904 | 11/1983 | Hamada et al. | 356/5 |
| 4,433,335 | 2/1984 | Wind | 343/463 |
| 4,453,825 | 6/1984 | Buck et al. | 356/5 |
| 4,488,154 | 12/1984 | Ward | 343/9 R |
| 4,536,763 | 8/1985 | von Pieverling | 343/9 R |
| 4,537,502 | 8/1985 | Miller et al. | 356/5 |
| 4,583,177 | 4/1986 | Meyer | 342/47 |
| 4,600,997 | 7/1986 | Cain et al. | 364/505 |
| 4,630,685 | 12/1986 | Huck, Jr. et al. | 172/2 |
| 4,644,358 | 2/1987 | Sekine | 342/356 |
| 4,658,257 | 4/1987 | Izutani et al. | 342/372 |
| 4,659,982 | 4/1987 | Van de Velde et al. | 324/77 G |
| 4,665,404 | 5/1987 | Christy et al. | 342/463 |
| 4,674,054 | 6/1987 | Ikeda et al. | 364/477 |
| 4,676,634 | 6/1987 | Petersen | 356/4 |
| 4,703,444 | 10/1987 | Storms et al. | 364/460 |
| 4,703,820 | 11/1987 | Reinaud | 180/169 |
| 4,730,190 | 3/1988 | Win et al. | 342/118 |
| 4,732,471 | 3/1988 | Cain et al. | 356/152 |
| 4,743,418 | 7/1973 | Heflinger | 356/5 |
| 4,756,617 | 7/1988 | Cain et al. | 356/4 |
| 4,757,330 | 9/1973 | Hotston | 343/12 R |
| 4,831,539 | 5/1989 | Hagenbuch | 364/449 |
| 4,864,513 | 2/1975 | Halajian et al. | 178/6.6 |
| 4,884,208 | 11/1989 | Marinelli et al. | 364/460 |
| 4,918,610 | 4/1990 | Becker | 364/451 |
| 4,976,619 | 12/1990 | Carson | 364/460 |

FOREIGN PATENT DOCUMENTS

| | | |
|---|---|---|
| 2620809 | 11/1977 | Fed. Rep. of Germany . |
| 2853317 | 6/1980 | Fed. Rep. of Germany . |
| 3234446 | 4/1984 | Fed. Rep. of Germany . |
| 3311349 | 10/1984 | Fed. Rep. of Germany . |
| 229866 | 11/1985 | German Democratic Rep. . |
| 742844 | 2/1978 | U.S.S.R. . |
| 2076152 | 11/1981 | United Kingdom . |

OTHER PUBLICATIONS

Lee; "The Use of a Minicomputer for On-Line Control of A Taxi Fleet"; IEEE Transaction on Vehicular Technology; vol.-23, No. 3, Aug. 1974.

*Primary Examiner*—Thomas G. Black
*Assistant Examiner*—Ellis B. Ramirez
*Attorney, Agent, or Firm*—Lahive & Cockfield

[57] ABSTRACT

Position detection methods and apparatus include transmitters, coupled to each object to be tracked, for transmitting signals uniquely identifying each transmitter. Receivers disposed at known locations receive the transmitted signals and generate received signals representative of the transmitted signals. Arrival-time elements, responsive to a selected zero-crossing or other event in each received signal, determine the respective arrival time of each transmitted signal at each receiver. A processor calculates differences in arrival times of the transmitted signals at each receiver, and determines the spatial position of each object with respect to the known locations of the receivers.

33 Claims, 4 Drawing Sheets

METHOD AND APPARATUS FOR POSITION DETECTION

BACKGROUND OF THE INVENTION

This invention relates generally to systems for position detection and ranging, and, more particularly, relates to apparatus and methods for precise determination of the position of multiple movable objects, utilizing transmission and detection of electromagnetic energy.

Position detection and tracking of movable objects is useful in a wide variety of applications, including construction site vehicle tracking, fleet vehicle dispatch and monitoring, courier monitoring, industrial robot control, tracking of animal migration, monitoring of human operatives or mechanical devices in remote areas, and battlefield command and control.

A number of systems have been proposed or constructed for monitoring the position of movable objects by dispatch personnel, or for advising vehicle operators of instantaneous position. Conventional LORAN systems, for example, carried by air- and seacraft, inform the pilot of vehicle position with respect to multiple transmitters situated at known, fixed locations. In these systems, measurement of distance between the vehicle and transmitters is implemented by comparison of phase between arriving signals. The following U.S. and foreign patents and patent applications disclose various position measurement or detection systems.

| | |
|---|---|
| Cain et al. | 4,756,617 |
| Cain et al. | 4,732,471 |
| Win et al. | 4,730,190 |
| Reinaud | 4,703,820 |
| Petersen | 4,676,634 |
| Cain et al. | 4,674,870 |
| Ikeda et al. | 4,674,054 |
| Christy et al. | 4,665,404 |
| Van de Velde et al. | 4,659,982 |
| Izutani et al. | 4,658,257 |
| Sekine | 4,644,358 |
| Huck, Jr. et al. | 4,630,685 |
| Cain et al. | 4,600,997 |
| Miller et al. | 4,537,502 |
| von Pieverling | 4,536,763 |
| Ward | 4,488,154 |
| Buck et al. | 4,453,825 |
| Wind | 4,433,335 |
| Hammada et al. | 4,413,904 |
| Vachenauer et al. | 4,319,243 |
| Etsusaki et al. | 4,273,196 |
| Hill et al. | 4,171,907 |
| Brenner | 4,140,060 |
| Zindler | 4,119,379 |
| Endo | 4,110,754 |
| Roeder et al. | 4,106,017 |
| Roeder et al. | 4,103,302 |
| Martens | 4,021,116 |
| Halajian et al. | 3,864,513 |
| Cornsweet | 3,864,030 |
| Funk et al. | 3,775,735 |
| Hotston | 3,757,330 |
| Heflinger | 3,743,418 |
| Ross | 3,652,161 |
| Studebaker | 3,588,249 |
| Green | 1,750,668 |
| German | 3,311,349 |
| German | 3,234,446 |
| German | 2,853,317 |
| German | 2,620,809 |
| Great Britain | 2,076,152 |
| Soviet Union | 742,844 |
| East Germany | 229,866 |

The Ikeda et al. patent discloses a radio system for automatic control and positioning of machinery. The system includes high frequency inductive radio cables located in pairs along the paths taken by the machines. The cables are connected to address detectors and transceivers in a centrally controlled system. Each machine is provided with a radio and antenna for receiving commands from the controller. The controller detects the location of each machine, as indicated by phase shift of the lines.

The Christy et al. patent discloses a positioning system including base stations having a clock, and a circuit synchronized with the clock for transmitting a spread-spectrum signal. A mobile station comprises a clock synchronized with the base station clock. A circuit receives the spread signal and compares the timing of the signal to the timing of the mobile station clock for producing a phase difference signal indicative of range from a base station.

Van de Velde et al. discloses a microwave system including microwave receiving antennas and at least one correlator. A radiating antenna emits microwave radiation from a source having predetermined characteristics. The transmitted microwave signal is received by antennas at different locations, and circuits are provided to measure the time elapsed between two zero crossings of the received signals.

Sekine discloses an orientation measurement apparatus including an antenna for receiving global positioning system (GPS) radio waves and devices for rotating the antenna. Circuitry is provided for detecting the orientation of GPS satellite by detecting phase differences of the received wave during a period of rotation of the antenna.

Huck, Jr. et al. discloses apparatus for controlling a bulldozer or other earthmoving equipment. The apparatus evaluates longitudinal angular velocity of a bulldozer to control the position/elevation of the bulldozer blade.

Miller et al. discloses a target ranging system including a carrier frequency transmitter and a generator for generating at least two modulating signals for modulating the carrier. A receiver is provided for receiving a reflected signal from the target and for producing a corresponding received electrical signal. A phase detection device detects phase differences between the modulating signals and each of the received signals, and a data processor utilizes the detected phase differences to calculate range.

Ward discloses a radar processor including circuitry for deriving signals from reflections of directively radiated groups of at least three radar pulses in which the interpulse periods in each group are equal.

Buck et al. discloses an electronic distance meter which measures distance to a moving target by comparing the phase of a signal propagated to the target with the phase of the reflected signal.

Wind discloses a transmitter locating apparatus including circuitry for receiving electromagnetic radiation from the transmitter. The radiation is demodulated individually from each of plural receivers. A digital computer Fourier transforms the demodulated radiation and provides signals representing the radiation as a function of frequency. An additional computing device establishes a signal representing the phase difference between the demodulated radiation from each of the signals. The apparatus correlates signal timing differences to a hyperbolic surface of rotation on which the transmitter is located.

Vachenauer et al. discloses a system for determining the position of vehicles by measuring reception time differences. An area is scanned by a narrow beam from an electronically steered phased array antenna driven by the interrogating transmitter of a secondary radar system. A receiving antenna, remote from the interrogator and its beam, is similarly scanned. The identifying response from a transponder in a vehicle is received, and the vehicle position is computed from the differences between the times of reception, utilizing a hyperbolic algorithm.

Etsusaki et al. discloses a system for automatically maintaining the blade of an earthmoving machine in a predetermined relationship to a reference beam. A beam receiver, mounted on a rotatable shaft attached to the blade, includes vertically arrayed beam receiving elements for generating a signal representative of beam height. In response to the detected signal, actuators coupled to the blade raise and lower the blade to vertically align the beam receiver with the beam.

Hill et al. discloses an electro-optical distance measuring device including circuits for generating a light signal that is amplitude modulated by three selectable frequencies. Optics focus the modulated light onto the target, and receive reflection of the light therefrom. Additional circuits convert the received light to electrical signals representative of the light, and compute the phase angles between these signals and the amplitude modulating signals. The distance to the target is calculated from these phase angles.

Brenner discloses an optical system wherein pulses of optical energy are intensity modulated by a radio frequency subcarrier and transmitted to a moving target. Reflected pulses from the target are received, and target velocity information is generated from the doppler frequency shift of the radio frequency subcarrier of the return pulses.

The Roeder '017 and '302 patents disclose velocity sensors using a transmitter on an aircraft to direct a radar beam at an object. A receiver mounted on the aircraft receives reflected pulses through an antenna which has forward and aft phase center locations. A computer system performs a time/amplitude comparison of the signals detected at the aft phase center location against the signal detected at the forward phase center location a selected interval earlier in time.

Martens discloses electro-optical distance measuring apparatus for measuring the distance between a moving object and a stationary object. The apparatus includes circuitry for generating a series of cyclic radiation fringe patterns, which vary in correspondence with movement of the object being observed.

Hotston discloses an interferometer for measuring the distance to a moveable object. The interferometer includes a waveguide for radiating energy toward the object and for receiving energy reflected from the object.

Ross discloses distance measuring apparatus in which distance is measured by detecting the travel time of an energy pulse, using a measuring signal which is short relative to the distance being measured.

Green discloses apparatus for measuring the position of moving objects, including elements for transmitting, between fixed and moving stations, electromagnetic signals whose phase is related to a frequency generated at the fixed station. A comparison is made between the phase of the signal generated at the fixed station and the phase of a signal which has been shifted in phase by transmission. The position of the moving object is calculated from the phase adjustment necessary to bring the compared frequency components into phase with each other.

The German 3,311,349 publication discloses a position measurement system in which an optical receiver mounted on a vehicle is interrogated using a laser source. The laser source emits two encoded laser beam "barriers" in which each individual beam has both fixed and angle dependent laser beam modulation frequencies. The receiver provides a reference frequency, which is phased to the fixed source frequency. The receiver includes circuitry for measuring the time of receipt and the polarization direction of both modulation frequencies. Speed, direction and distance are determined from phase differences, receive times, and angles.

German 2,620,809 discloses a system for automatic position monitoring and control of an earthmover blade. A computer, utilizing information from angle transducers located on the earthmoving machine, compares the actual angles of elements of the blade to predetermined values required to create an embankment having a selected slope. In response, actuators regulate the motion and position of the blade to provide the selected embankment slope.

East German 229,866 discloses apparatus in which a hyperbolic position calculation is executed. The arrangement includes a command center, at least three measurement stations, and a mobile transmitter which is to be located. Transit time difference is measured by phase comparison and processed to enable a determination of mobile transmitter location.

Conventional systems typified by the disclosures of these publications, however, typically fail to provide rapid, precise, inexpensive measurement of the position of multiple movable objects in three spatial dimensions. Certain conventional position detection systems are hampered by data communications channels unable to provide high-speed multiple signal processing for precise, real-time ranging and position detection of multiple objects. Additionally, many conventional position detection and ranging systems require that each movable object be fitted with a relatively complex and expensive transceiver.

It is thus an object of the invention to provide position detection methods and apparatus which enable rapid, precise determination of object position in three spatial dimensions.

A further object of the invention is to provide position detection methods and apparatus which are relatively simple and economical to implement, wherein the bulk of electronic complexity and cost is allocated to a single base station, and wherein multiple target transceivers can be deployed at optimally low cost.

Another object of the invention is to provide such methods and apparatus which can utilize existing communications channels and apparatus.

Other general and specific objects of the invention will in part be obvious and will in part appear hereinafter.

SUMMARY OF THE INVENTION

The foregoing objects are attained by the invention, which provides methods and apparatus for precisely determining, in real-time, the spatial position of at least one object, such as a vehicle. One aspect of the invention can include transmitters mounted on the targets, a set of receivers having known locations, and a central processor coupled to the receivers via a communications channel. Each transmitter periodically transmits a burst of pulsed energy. The receivers receive the pulsed energy bursts from each transmitter, convert them into pulsed electronic signals representative of the energy bursts, and provide the electronic signals to the central processor. The central processor evaluates a selected distance-independent event—such as a threshold crossing—in each electronic signal to establish the arrival time of the energy bursts at each receiver, and compares the arrival times of the energy bursts at each receiver to calculate the position of a corresponding transmitter.

In another aspect of the invention, the system is adapted for determining the position and attitude of multiple vehicles or personnel on a construction site. The central processor can be a microcomputer, and the pulsed energy bursts can include pulses that uniquely identify the transmitter, and pulses for error detection. The system can further include storage and display elements in communication with the central processor, for displaying and storing a representation of the site and the relative positions of vehicles and personnel.

In a further aspect of the invention, at least a first transmitter coupled to each object to be tracked transmits a first modulated electromagnetic radiation signal representative of a first digital bitstream. This first digital bitstream incorporates a set of selected tag bits uniquely identifying the first transmitter.

The invention further includes a plurality of receivers disposed at known locations, for receiving the first electromagnetic radiation signal and for generating digital received bitstream signals representative of the first digital bitstream. A position calculation module, coupled to the receiving elements, processes the received bitstream signals to calculate the spatial position of each tracked object with respect to the selected known locations of the receivers.

The position calculation module can include arrival-time elements, responsive to a selected event in each received bitstream signal, for determining a unique arrival time value for each received bitstream signal. These arrival-time values are representative of respective times at which the first electromagnetic radiation signal is received at respective receivers. The selected event in the received bitstream signal can include any of a selected threshold crossing or a selected signal value.

The position calculation elements also include a central processor, responsive to the arrival-time values, for calculating differences in arrival times of the first electromagnetic radiation signal at respective receivers, to determine the spatial position of each object with respect to the known locations of the receivers.

A further aspect of the invention includes signal demodulation elements, coupled to the receiving elements, for demodulating the received signals. These elements provide amplitude, frequency, phase, or baseband demodulation, depending upon the modulation of the signal emitted by the transmitters.

The invention also provides for controlling transmission of signals from each transmitter, by sensing transmission of signals from each transmitter, generating a collision detection signal in response to substantially simultaneous transmission of signals, and selectively enabling or deferring transmission in response to the collision detection signal. Transmission of signals can be deferred for a selected time period, or until the communications channel is quiet.

Error correction codes can be embedded in the transmitted signals, to be processed by error detection elements in the central processor, to enable detection of errors in the electrical receive signal.

The invention will next be described in connection with certain illustrated embodiments; however, it should be clear to those skilled in the art that various modifications, additions and subtractions can be made without departing from the spirit or scope of the claims.

BRIEF DESCRIPTION OF THE DRAWINGS

For a fuller understanding of the nature and objects of the invention, reference should be made to the following detailed description and the accompanying drawings, in which.

DESCRIPTION OF PREFERRED EMBODIMENTS

Figure 1A:
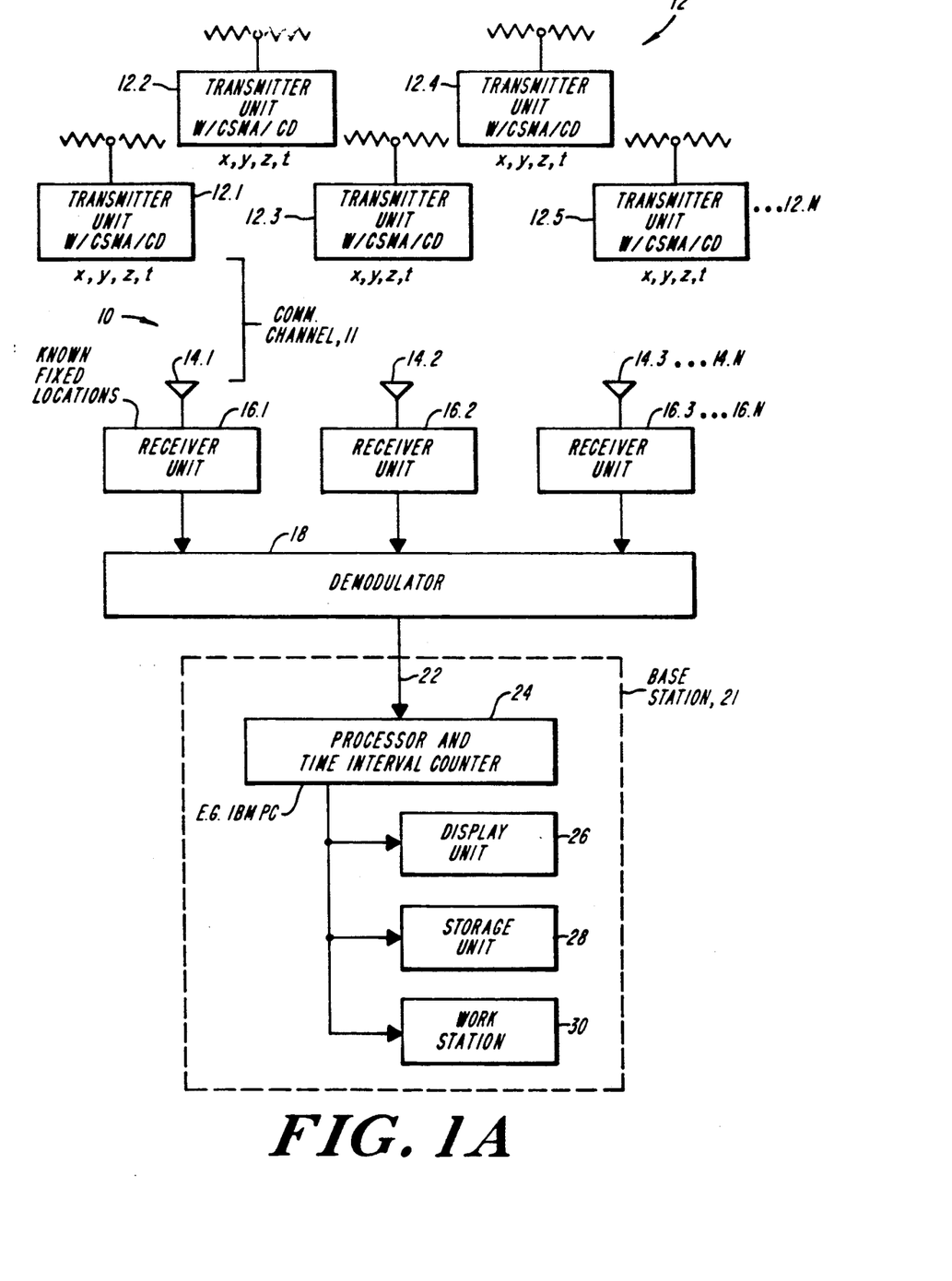
FIG. 1A is a block diagram depicting position detection apparatus constructed in accordance with the invention.

FIG. 1A is a block diagram depicting a position detection system 10 constructed in accordance with the invention, for accurately determining the position of multiple movable objects, such as vehicles, personnel, or animals. The invention determines the position of each object by precisely measuring the arrival time, at receivers whose locations are fixed and known, of energy pulses emitted by transmitters affixed to the objects. The energy pulses can include radio, microwave, or light components, and can have selected identification or "tag" values, emitted from transmitters mounted in known locations on the objects to be tracked. The invention can utilize trigger circuits which generate a TTL-level pulse when a transmitted energy pulse is detected. As described below, a single, high-precision time-interval counter and microprocessor of conventional design and construction can be employed to determine, in real-time, the location of each of the multiple objects.

Referring to FIG. 1A, the system 10 can include transmitters 12.1, 12.2, . . . , 12.M which can be affixed to each movable object. Each transmitter emits an energy pulse, which can include radio, light, or microwave energy components. The energy pulses can be transmitted over a communications channel 11, in a manner discussed in greater detail hereinafter, and received by receivers 16.1, 16.2, . . . , 16.N having corresponding antennas 14.1, 14.2, . . . , 14.N, respectively. The received signals are conducted via a bus or communications channel 22 from the receivers 16 to a base station 21. The base station 21 can include a demodulator unit 18 for demodulating the received signals, a processor and time interval counter module 24, discussed in greater detail below, and conventional display unit 26, storage unit 28, and workstation 30 coupled to module 24. While FIG. 1A depicts the demodulator 18 as a discrete component contained in base station 21, signal demodulation can alternatively be provided by multiple demodulator units, each corresponding to, and incorporated into, a respective receiver module. The demodulator unit 18 can incorporate circuitry of known design for providing selected demodulation of the received signals.

Figure 1B:
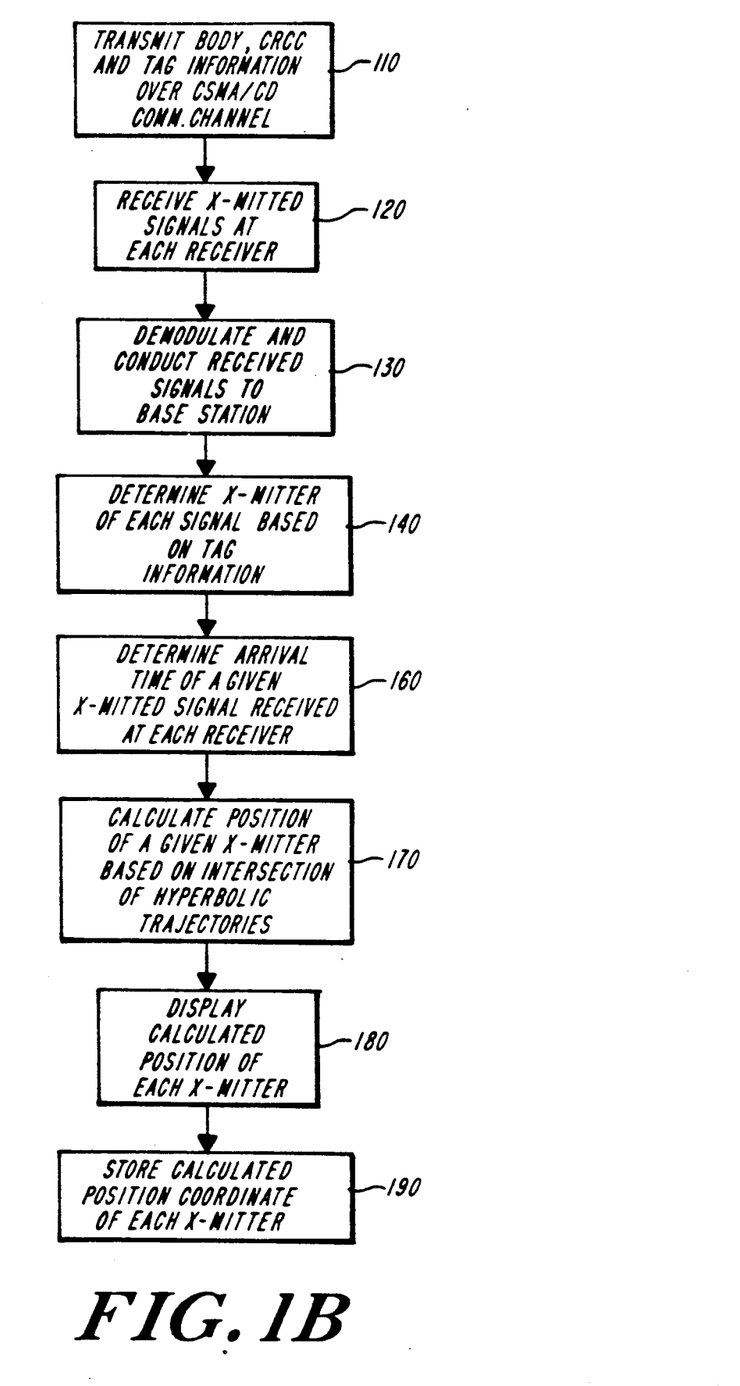
FIG. 1B is a flowchart illustrating the steps of a method according to the invention, implemented by the apparatus of FIG. 1A.

Referring to FIG. 1A and FIG. 1B (which presents a flowchart of a position detection method executed by the apparatus of FIG. 1A in accordance with the invention) each transmitter 12 can transmit a signal "burst" which is processed by the system 10 to obtain an accurate determination of the position of each transmitter 12. This transmission is indicated in step 110 of FIG. 1B. The burst can include radio, light, or microwave energy components, can be digital or analog in form, and can be modulated in amplitude, frequency, phase, or baseband modes. The term "demodulation" is therefore defined herein to include amplitude, frequency, phase and baseband demodulation.

The invention can be practiced in connection with a variety of digital implementations, utilizing a number of different methods to transport a digital bitstream between the transmitters and receivers. For example, an RF baseband can be transmitted, with a selected portion being modulated by AM, FM phase, or as a spread spectrum transmission. Alternatively, an optical energy baseband can be generated, modulated in accordance with known optical signal processing techniques.

Moreover, as indicated in step 110 of FIG. 1B, the communications channel 11 between the transmitters 12 and the receivers 16 (FIG. 1A) is preferably managed by a distributed control protocol referred to as "carrier sense multiple access with collision detection" (CSMA/CD). The communications channel 11 can be implemented in connection with communications channel control elements analogous to those utilized in conventional communications networks utilizing the Ethernet protocol. The Ethernet is described in Shoch et al., *Evolution of the Ethernet Local Computer Network*, 1982, IEEE, incorporated herein by reference. The CSMA/CD protocol, and the function of communications channel control elements and transmitters 12 in conjunction with this protocol, are discussed in greater detail hereinafter.

Figure 2A:
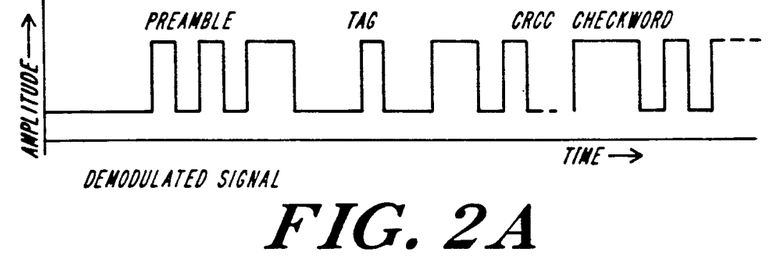
FIG. 2A depicts a demodulated, decoded signal generated by the system of FIG. 1A.

The signal transmitted by the transmitters 12 and received by receivers 16 can include several components, as depicted in FIG. 2A. One component is a "tag" portion that uniquely identifies the transmitter. Each signal can begin with a known pattern of bits forming the preamble. This component can be used by the receiver to establish bit synchronization and then to locate the first bit of the packet. The preamble is inserted by the transmitter and can be stripped off by the controller at the base station.

Each signal can also include a cyclic redundancy checksum (CRCC) error checking word which, in accordance with conventional signal processing practice, can be utilized by the base station 21 to determine whether the transmitted signal was corrupted by interference or other communications problems. The CRCC checkword can include, for example, a sixteen-bit data word representative of the coefficients of a polynomial. Using this data word, the processor and time interval counter module 24, contained in base station 21, can perform error checking in a known manner, by shifting the received bits through a CRCC register to provide division by a selected quantity, and testing whether the register contents are equal to zero.

Again referring to FIGS. 1A and 1B, following transmission of signals over the CSMA/CD communications channel 11 (FIG. 1A) the receivers 16 receive the transmitted signals through respective antennas 14 (step 120 of FIG. 1B), and the received signals are conducted via bus or communications channel 22 (step 130 of FIG. 1B) to the base station 21, for processing by demodulator 18 and processor unit and time interval counter module 24. The processor and time interval counter module 24 can include, for example, a conventional microcomputer, such as an IBM PC. Those skilled in the art will recognize that the processor unit can alternatively be implemented in connection with any conventional digital or analog computer, microprocessor, computer, or computational circuit, designed, constructed, and programmed in accordance with known engineering principles. A preferred processor can include a reduced instruction set (RISC) device augmented by floating point calculation capabilities. Base station 21 can also include a transmitter, for communication back to mobile units, as well as a receiver. The structure and operation of these signal generating and processing components are addressed in greater detail hereinafter.

Referring again to FIGS. 1A and 1B, following receipt of emitted signals, the base station 21, including the processor and time interval counter module 24, determines which transmitter among a plurality of transmitters emitted a given received signal (step 140 of FIG. 1B). This determination is executed by processor and time interval counter module 24, by evaluating the tag information contained in each signal.

Figure 2B:
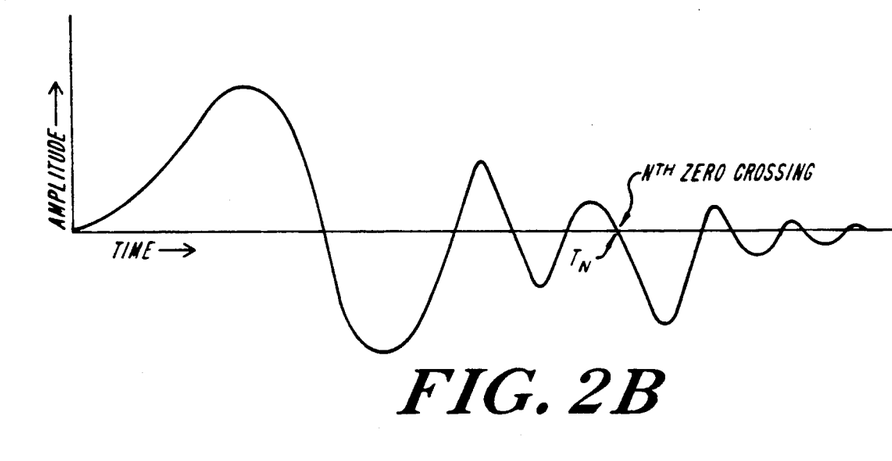
FIG. 2B depicts a modulated signal generated by the system of FIG. 1A.

Processor and time interval counter module 24 then assigns an arrival time value or an arrival time difference value to each signal (step 160 of FIG. 1B). The arrival time values or arrival time difference values, respectively, are representative of either the absolute time when each signal was received at each receiver, or the differences in arrival time among various signals. Each arrival time or arrival time difference value is assigned by the processor, in cooperation with the multiple receivers. In particular, arrival is signaled when the processor and time interval counter module 24 detects the occurrence of a selected event in the received signal. The selected event is preferably distance invariant, and can be, for example, a selected threshold crossing in an analog received signal. This is depicted in FIG. 2B, in which the Nth zero crossing, occurring at time Tn, is selected as the triggering event. Alternatively, if the received signal is digital, a selected top-of-bit value can be selected as the triggering event.

Moreover, steps 140 and step 160 of FIG. 1B can be reversed, so that arrival time or arrival time difference information is determined prior to identification of the transmitter associated with each received signal.

Figure 3A:
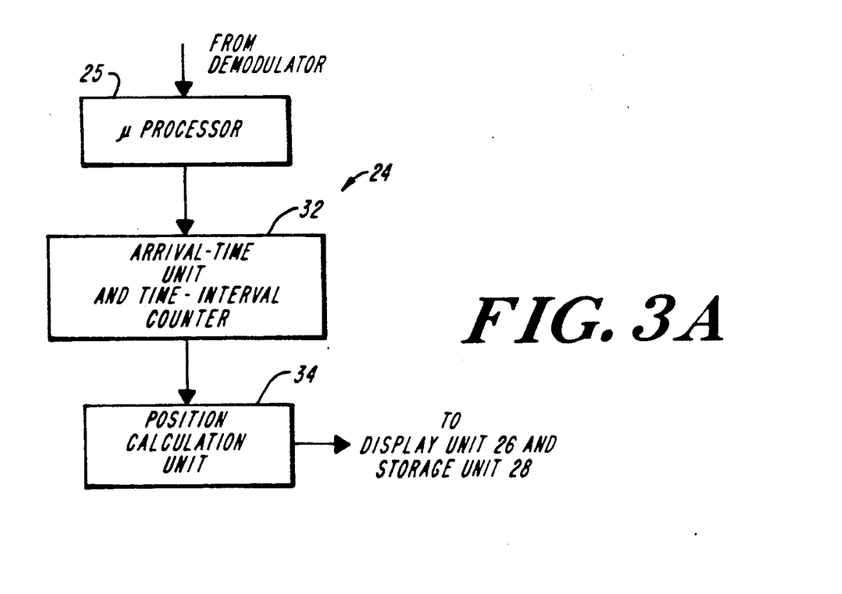
FIG. 3A is a block diagram depicting components of the processor unit of FIG. 1A.

The system is configured so that each receiver 16 is at a known, fixed location, and there is a known propagation time between the receivers 16 and the base station 21, including processor and and time interval counter module 24. Accordingly, the arrival time or arrival time difference value of each received, demodulated signal at the processor can be utilized to calculate the position of each transmitter. In particular, the X, Y, Z coordinates of each transmitter, and the identity of each transmitter, are determined by the processor and time interval counter module 24 incorporated within the base station 21. The position of each transmitter can then be calculated (step 170 of FIG. 1B) by known techniques, including computing a set of hyperbolic loci from arrival time differences, and calculating the intersection of the set of loci. As depicted in FIG. 3A, the processor and time interval counter module 24 can incorporate a conventional microprocessor 25, an arrival time unit and time interval counter 32, and a position calculation unit 34 to assign arrival times and calculate transmitter coordinates. The position calculation unit 34 can utilize conventional computational circuitry to solve for the intersection of hyperbolic curves, using known techniques such as Newton's method, to determine transmitter position. This hyperbolic position calculation is utilized because an arrival time difference between two receivers corresponds to the loci of possible positions along a hyperbolic curve. The processor and time interval counter module 24 can therefore evaluate arrival time differences to solve four equations for four unknowns —i.e., X, Y, Z, and T, where X, Y, Z are the coordinates of the transmitter, and T is the time of transmission. The system can therefore provide multi-axis (X,Y,Z) position detection. While position calculation unit 34 is depicted as a discrete component in FIG. 3A, its function can alternatively be implemented in microprocessor 25, as discussed hereinafter. Those skilled in the art will appreciate that precision of position calculation is enhanced if the start of the time interval is triggered by the processor and time interval counter module 24 upon detection of an edge in the received signal, rather than a digital HIGH or LOW value. Thus, the triggering event could be the rising edge of the Nth bit following a recognized preamble, at which time the processor and time interval counter module 24 activates an accurate time interval counter contained in module 32 of FIG. 3A. This embodiment has measured differences in arrival time to within 25 picoseconds—i.e., within one-fortieth of a foot at the speed of light.

In applications where precision is less critical, the start of the time interval can be signalled by the Nth digital HIGH or top-of-bit, at which time the time interval counter in module 24 is activated. This method is less precise, but can suffice if the bitstream rate is very high. Alternatively, the processor 25 in module 24 can maintain a fast-running clock and digitally record arrival time at each receiver. Thus, where only moderate precision is required, the entire time interval measurement process can be implemented in software, if practiced in connection with a sufficiently powerful processor having a high clock speed. In such an embodiment, the preamble or Nth bit of the received signal would be time-stamped for measurement of arrival time differences.

In a preferred embodiment of the invention, a two-dimensional plan view or three-dimensional representation of the transmitter locations can be displayed—using known computer graphics techniques—at the base station (step 180 of FIG. 1B) and stored (step 190 of FIG. 1B) in the storage unit 28 of FIG. 1A. Display output can be provided at the display unit 26 or workstation 30. The transmitter locations can be superimposed on a map of the site or area of operations. Alternatively, the transmitter locations can be displayed and updated dynamically in three dimensions by remote computers, which can be linked to the base station by modem or other conventional communications devices.

In one embodiment of the invention, the transmitters 12 illustrated in FIG. 1A can include, for example, a simple frequency-modulated transmitter module. The transmitter module need not have a highly stable local oscillator. In one embodiment of the invention, each receiver demodulates a received signal into a TTL-level signal and repeats it over an optical or hard-wired communications channel to the base station 21. The processor in module 24 of base station 21 can utilize a time-interval counter, such as the Stanford Research Systems SR620, to measure the difference in arrival time between the leading edges or other selected feature of the signals from pairs of receivers.

The transmitted signal can be Manchester-coded, a protocol in which each bit cell has two parts: the first half of the cell is the complement of the bit value and the second half is the bit value. Thus, there is always a transition in the middle of every bit cell, and this is used by the receiver to extract the clock and data values. If the transmitted signal is Manchester-coded, the processor 24 can utilize additional bits in the Manchester-coded signal to determine the identity of the transmitter, and utilize the final CRCC bits to determine whether the signal was corrupted by interference. The exemplary demodulated waveform shown in FIG. 2A corresponds to a Manchester-decoded transmitted signal—i.e., a signal from which the Manchester code has been removed—including identifying bits and CRCC bits.

As discussed above, the invention preferably utilizes a shared communications channel 11 by which the output of transmitters 12 is transmitted to receivers 16. One configuration of a such a channel is described in Shoch et al., *Evolution of the Ethernet Local Computer Network*, 1982, IEEE, incorporated herein by reference. In one practice of the invention, the communications channel 11 is a shared RF transmission medium. The transmission medium can alternatively include other broadcast media, such as coaxial or optical cable.

The shared communications channel, as discussed above in connection with FIG. 1A, is preferably managed by a distributed control protocol referred to as "carrier sense multiple access with collision detection" (CSMA/CD). The CSMA/CD protocol eliminates the requirement for a central controller managing access to the channel, and utilizes no pre-allocation of time slots or frequency bands. A transmitter unit 12 wishing to transmit to the base station 21 contends for the common shared communications channel 11 until it acquires the channel. When the channel is acquired, the unit employs it to transmit signals. This process (corresponding to step 110 of FIG. 1B) is schematically illustrated in FIG. 3B.

Figure 3B:
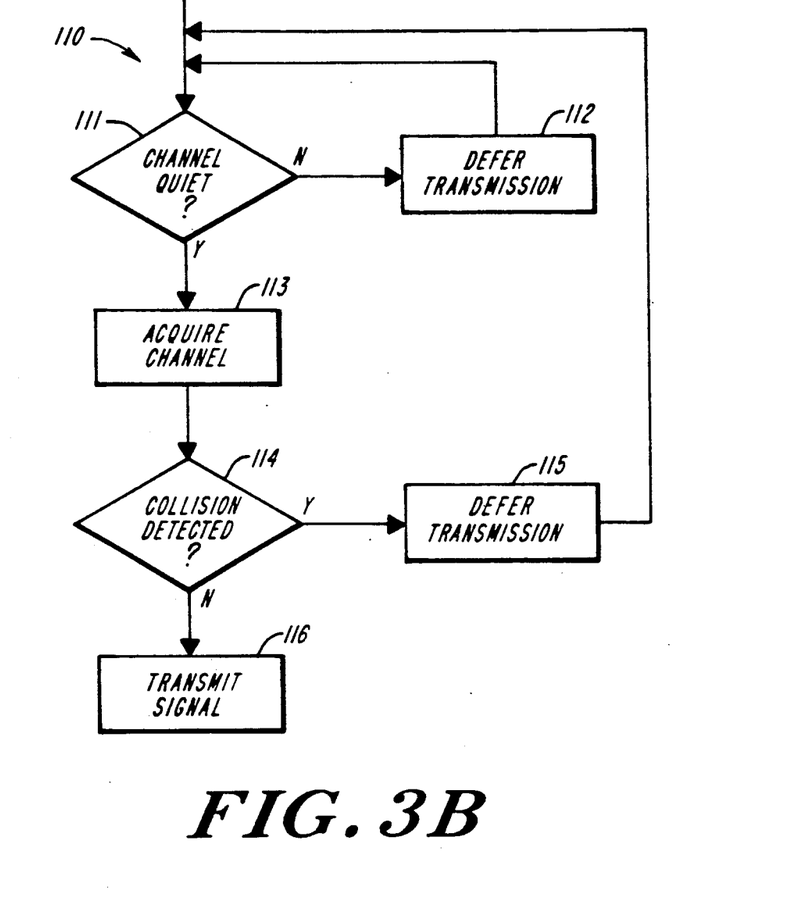
FIG. 3B is a flowchart depicting steps implemented by the transmitters utilized in accordance with the invention.

To acquire the channel, each unit confirms whether the channel is in use—i.e., "carrier present"—by employing "carrier sense" (step 111 of FIG. 3B). The presence of a signal is indicated by the presence of carrier, or transitions in received values. If the channel is in use, the unit defers transmission of signals (step 112) until the channel is quiet. When quiet is detected, the unit immediately begins to transmit (step 113). This is illustrated in the flowchart of FIG. 3B. During transmission, the sending unit monitors for a collision (step 114)—i.e., other sending units attempting to use the channel at the same time.

In a correctly functioning system, collisions occur only within a brief time interval following the start of transmission, because after this interval, all stations will detect carrier and defer transmission. This time interval is called the "collision window" or the "collision interval", and is a function of maximum propagation delay within the channel, or from one transmitter to another. If no collisions are detected (step 114) during this time, a transmitter has acquired the channel and continues transmission of the packet (step 116). If a sending unit detects collision (step 114), the transmission of the remainder of the signal can be aborted (step 115). To ensure that all parties to the collision have properly detected the collision, any sending unit which detects a collision can invoke a collision consensus enforcement procedure which briefly jams the channel. Each transmitter involved in the collision can then schedule its request for location for retransmission at some later time.

To minimize repeated collisions, each station involved in a collision can attempt to retransmit at a different time by scheduling the retransmission to take place after a random delay period. In order to achieve channel stability under overload conditions, a controlled retransmission strategy can be employed, in which the mean of the random retransmission delay is increased as a function of the channel load.

The CSMA/CD access procedure can be practiced in connection with any broadcast multi-access channel, including radio, twisted pair, coaxial cable, diffuse infrared, or fiber optic components. In one practice of the invention, collision detection can be implemented in conjunction with the processor and time interval counter module 24, by executing a collision detection algorithm. In particular, the processor of module 24 can utilize a simple CRCC checksum to determine whether a signal collision has occurred, aborting signal processing if a collision is detected. The processor of module 24 can continuously monitor receiver output to detect the presence of transmitted signals. Monitoring can be implemented by known techniques such as polling loops or interrupt processing. The processor can generate a table of times at which signals are received, record the occurrence of communications channel collisions, and, where required, incorporate supplemental data into the bitstream, in addition to X, Y, Z, and T—where X, Y, Z are the coordinates of a given transmitter, and T is the time of transmission of a burst.

Those skilled in the art will appreciate that many conventional direction finding and position detecting systems do not employ time-interval measurement for high-precision position determination, because highly accurate time-interval measurement has only recently become available. The invention exploits the availability of accurate time interval measurement to provide a position detection system utilizing measurement of arrival time differences of an energy pulse at receivers placed at known locations. Moreover, the invention advantageously reduces the number of precision analog components required for position detection. The illustrated system can be constructed almost entirely from inexpensive digital components. Only one element—i.e., the time-interval counter incorporated in arrival-time module 32, need contain high-precision analog components. This time-interval counter can consist of a commercially-available time-interval counter. Such counters, having sufficient accuracy and appropriate data interface ports for practicing the invention, can be obtained at moderate cost. As discussed above, a suitable time interval counter is manufactured by Stanford Research Systems of Sunnyvale, Calif.

The invention can be adapted to high-precision location of fleet vehicles and construction machinery at relatively short distances, or to position detection of aircraft, ships and other civilian and military objects over longer distances. In particular, the system is useful in air traffic control, harbor management, slope monitoring, mining, dam and waterways management, and can substantially reduce the cost of automated position monitoring systems.

Those skilled in the art will appreciate that methods and apparatus in accordance with the invention provide a number of advantages over the prior art. For example, only one component, the time-interval counter, need be constructed to high-precision tolerances. Accordingly, the cost and complexity of the system is reduced. Apparatus in accordance with the invention can be constructed from conventional cordless telephones and low-cost modems (e.g., 2400 baud). Users who already have a data link system can therefore obtain location information for the minimal additional cost associated with additional receivers. Such a system can provide position detection, data communication and collision detection, utilizing a shared communications channel to transport an information-carrying bitstream from the transmitters to each receiver.

Additionally, one-shot time interval measurements accurate to 25 picoseconds can be achieved, yielding distance measurement precision within one centimeter, depending on the shape of the received pulse, the design of the receivers and the location of the antennas. The positions of multiple sources can be determined in real-time.

It will thus be seen that the invention efficiently attains the objects set forth above, among those made apparent from the preceding description. In particular, the invention provides position detection methods and apparatus which enable rapid, precise determination of object position in three spatial dimensions, which are relatively simple and economical to implement, wherein the bulk of electronic complexity and cost is allocated to a single base station, and wherein the multiple movable object transceivers can be implemented at optimally low cost.

It will be understood that changes may be made in the above construction and in the foregoing sequences of operation without departing from the scope of the invention. Thus, for example, the invention may be practiced in connection with infra-red or microwave transmission and reception in place of the radio transmitters and receivers depicted in FIG. 1A. An optical embodiment of the invention can utilize a rotating laser beam or Xenon strobe source associated with each transmitter. The Xenon strobe signal, for example, can consist of a plurality of flashes of the Xenon strobe. Additionally, a "hardwired" communications channel can be provided by utilizing pre-tensioned reels of fiber optic cable. The propagation time between receiver and processor is then related to the length of cable unreeled.

It is accordingly intended that all matter contained in the above description or shown in the accompanying drawings be interpreted as illustrative rather than in a limiting sense. It is also to be understood that the following claims are intended to cover all of the generic and specific features of the invention as described herein, and all statements of the scope of the invention which, as a matter of language, might be said to fall therebetween.

Having described the invention, what is claimed as new and secured by Letters Patent is:

1. A system for determining, in real-time, the spatial position of at least one object, the system comprising
    transmitting means including at least one transmitter coupled to said at least one object for transmitting a modulated electromagnetic radiation signal, said transmitted signal being modulated with a data bitstream including transmitter identification data and having a time-variant waveform including a selected feature,
    receiving means, including a plurality of receivers disposed at selected known locations, for receiving said transmitted signal and for generating an electrical receive signal representative of said transmitted signal,
    demodulation means, coupled to said receiving means, for demodulating said electrical receive signal to generate a demodulated electrical signal, and
    processing means, coupled to said demodulation means, for identifying said at least one transmitter and calculating, in response to said demodulated electrical signal, the spatial position of said at least one object with respect to said selected known positions of said receivers, said processing means including
    arrival-time means for processing said demodulated electrical signal to generate arrival-time signals, said arrival-time signals being representative of respective arrival times at which said electromagnetic radiation is received at respective receivers,
    said arrival-time means including means for generating arrival time signals in response to the selected feature in said time-variant waveform, and
    calculation means, for processing said arrival-time signals associated with said at least one object and corresponding to respective receivers, to calculate the spatial position of said at least one object with respect to said selected positions of said receivers.

2. The system of claim 1 wherein said selected event includes any of a selected threshold crossing, or a selected edge in said waveform.

3. The system of claim 1 further including means for determining the spatial position of said at least one object in at least three orthogonal axes.

4. The system of claim 1 wherein said processing means further includes a microprocessor.

5. The system of claim 1 wherein said processing means further includes storage means for storing said position signals.

6. The system of claim 1 wherein said processing means further includes display means for displaying said position signals and arrival signals.

7. The system of claim 1 wherein said demodulation means provides any of amplitude, frequency, or phase demodulation of said electrical receive signal.

8. The system of claim 1 wherein said demodulation means provides baseband demodulation of said electrical receive signal.

9. The system of claim 1 wherein said transmitting means includes error correction code transmit means for incorporating an error correction code pulsetrain within said transmitted signal, each said error correction code pulsetrain being representative of a error correction code.

10. The system of claim 9 wherein said processing means further includes error detection means for recognizing each said error correction code pulsetrain within said demodulation signal to detect an error in said electrical receive signal.

11. The system of claim 1
    wherein said transmitting means includes at least two transmitters, and
    further comprising communication control means for controlling transmission of signals from each of said at least two transmitters.

12. The system of claim 11 wherein said communication control means includes
    carrier sense means for sensing transmission of signals from each of said at least two transmitters, and
    collision detection means, in communication with said carrier sense means, for generating a collision detection signal in response to substantially simultaneous transmission of signals by said at least two transmitters.

13. The system of claim 12 wherein said communication control means includes transmission control means, responsive to said collision detection signal, for selectively enabling and deferring transmission of signals from each of said at least two transmitters.

14. The system of claim 13 wherein said transmission control means includes means for deferring transmission of signals for a selected time period.

15. The system of claim 14 wherein said transmission control means further includes means for deferring transmission of signals from a given transmitter until at least one other of said at least two transmitters is inactive.

16. A method for determining, in real-time, the spatial position of at least one object, the method comprising
    coupling at least a first transmitter to said at least one object,
    transmitting with said at least first transmitter an electromagnetic radiation signal modulated with a data bitstream including transmitter identification data and having a time-variant waveform including a selected feature,
    disposing a plurality of receivers at selected known locations,
    receiving, using said receivers, said transmitted signal to generate an electrical receive signal representative of said transmitted signal,
    demodulating said electrical receive signal to generate a demodulated electrical signal,
    processing, utilizing a processor, said demodulated electrical signal, to identify said at least first transmitter and calculate the spatial position of said at least one object with respect to said selected known positions of said receivers,
    said step of processing said demodulated electrical signal including the steps of
    processing said demodulated electrical signal to generate arrival-time signals, said arrival-time signals being representative of respective arrival times at which said electromagnetic radiation is received at respective receivers,
    said step of processing said demodulated electrical signal including the step of generating arrival time signals in response to the selected feature in said time-variant waveform, and
    processing said arrival-time signals associated with said at least one object and corresponding to respective receivers, to calculate the spatial position of said at least one object with respect to said selected positions of said receivers.

17. The method of claim 16 wherein said selected event includes any of a selected threshold crossing, or a selected edge in said waveform.

18. The method of claim 16 further including the step of determining the spatial position of said at least one object in at least three orthogonal axes.

19. The method of claim 16 wherein said processing step further includes the step of utilizing a microprocessor.

20. The method of claim 16 wherein said processing step further includes the step of storing said position signals.

21. The method of claim 16 wherein said processing means further includes the step of displaying said position signals and arrival signals.

22. The method of claim 16 wherein said demodulation step includes the step of providing any of amplitude, frequency, or phase demodulation of said electrical receive signal.

23. The method of claim 16 wherein said demodulation step includes the step of providing baseband demodulation of said electrical receive signal.

24. The method of claim 16 wherein said transmitting step includes the step of incorporating an error correction code pulsetrain within said transmitted signal, each said error correction code pulsetrain being representative of a error correction code.

25. The method of claim 24 wherein said processing step further includes the step of recognizing each said error correction code pulsetrain within said demodulation signal to detect an error in said electrical receive signal.

26. The method of claim 16 further comprising the steps of
utilizing at least two transmitters for transmission of signals, and
selectively controlling transmission of signals from each of said at least two transmitters.

27. The method of claim 26 wherein said controlling step includes the steps of
sensing transmission of signals from each of said at least two transmitters, and
generating a collision detection signal in response to substantially simultaneous transmission of signals by said at least two transmitters.

28. The method of claim 27 wherein said controlling step further includes the step of selectively deferring transmission of signals from each of said at least two transmitters.

29. The method of claim 28 wherein said deferring step further includes the step of deferring transmission of signals for a selected time period.

30. The method of claim 29 wherein said deferring step further includes the step of deferring transmission of signals from a given transmitter until at least one other of said at least two transmitters is inactive.

31. A system for determining, in real-time, the spatial position of at least one object, the system comprising
strobe means, including at least one Xenon strobe element coupled to said at least one object, for generating at least one energy pulse,
receiving means, including a plurality of receivers disposed at selected known locations, for receiving said at least one energy pulse and for generating an electrical receive signal representative of said at least one energy pulse, and
processing means, coupled to said receiving means, for calculating, in response to said electrical receive signal, the spatial position of said at least one object with respect to said selected known positions of said receivers, said processing means including
arrival-time means for processing said electrical receive signal to generate arrival-time signals, said arrival-time signals being representative of respective arrival times at which said at least one energy pulse is received at respective receivers, and
calculation means, for processing said arrival-time signals associated with said at least one object and corresponding to respective receivers, to calculate the spatial position of said at least one object with respect to said selected positions of said receivers.

32. A system for determining, in real-time, the spatial position of at least one object, the system comprising
strobe means, including at least one rotating laser beam coupled to said at least one object, for generating at least one energy pulse of laser energy modulated with a data bitstream including strobe identification data,
receiving means, including a plurality of receivers disposed at selected known locations, for receiving said at least one energy pulse and for generating an electrical receive signal representative of said at least one energy pulse, and
processing means, coupled to said receiving means, for identifying the strobe means and calculating, in response to said electrical receive signal, the spatial position of said at least one object with respect to said selected known positions of said receivers, said processing means including
arrival-time means for processing said electrical receive signal to generate arrival-time signals, said arrival-time signals being representative of respective arrival times at which said at least one energy pulse is received at respective receivers, and
calculation means, for processing said arrival-time signals associated with said at least one object and corresponding to respective receivers, to calculate the spatial position of said at least one object with respect to said selected positions of said receivers.

33. A system for determining, in real-time, the spatial position of at least one object, the system comprising
strobe means, including at least one strobe element coupled to said at least one object, for generating at least one energy pulse,
the strobe means including radio transmitting means for transmitting at least one pulse of radio energy modulated with a data bitstream including strobe identification data and having a time-variant waveform,
receiving means, including a plurality of receivers disposed at selected known locations, for receiving said at least one energy pulse and for generating an electrical receive signal representative of said at least one energy pulse, and processing means, coupled to said receiving means, for identifying the strobe means and calculating, in response to said electrical receive signal, the spatial position of said at least one object with respect to said selected known positions of said receivers, said processing means including
arrival-time means for processing said electrical receive signals to generate arrival-time signals, said arrival-time signals being representative of respective arrival times at which said at least one energy pulse is received at respective receivers, said arrival-time means including means for generating arrival-time signals in response to a selected event in said time-variant waveform, and calculation means, for processing said arrival-time signals associated with said at least one object and corresponding to respective receivers, to calculate the spatial position of said at least one object with respect to said selected positions of said receivers.

* * * * *